(12) United States Patent
Bruder (10) Patent No.: US 8,572,928 B2
(45) Date of Patent: Nov. 5, 2013

(54) SYSTEM FOR ERECTING STRUCTURES AND SUPPORT PROFILE

(75) Inventor: Hans Bruder, Aichtal (DE)

(73) Assignee: Octanorm-Vertriebs-GmbH fuer Bauelemente, Filderstadt (DE)

( * ) Notice: Subject to any disclaimer, the term of this patent is extended or adjusted under 35 U.S.C. 154(b) by 822 days.

(21) Appl. No.: 11/949,322

(22) Filed: Dec. 3, 2007

(65) Prior Publication Data

US 2008/0148684 A1 Jun. 26, 2008

(30) Foreign Application Priority Data

Dec. 4, 2006 (DE) .................. 20 2006 018 839 U (51) Int. Cl.
*E04B 1/61* (2006.01)
*E04C 2/34* (2006.01)

(52) U.S. Cl.
USPC .............................................. 52/775; 52/222

(58) Field of Classification Search
USPC ............ 52/204.53, 213, 222, 235, 282.2, 765, 52/769, 773, 775
See application file for complete search history.

(56) References Cited

U.S. PATENT DOCUMENTS

| | | | | |
|---|---|---|---|---|
| 2,986,150 A | * | 5/1961 | Torian | 52/63 |
| 3,052,291 A | * | 9/1962 | Fellers | 52/207 |
| 3,092,219 A | * | 6/1963 | Young | 52/775 |
| 3,139,923 A | * | 7/1964 | Guttman | 160/89 |
| 3,222,841 A | * | 12/1965 | Lipof | 52/482 |
| 3,256,668 A | | 6/1966 | Downes | |
| 4,050,201 A | * | 9/1977 | Hubbard et al. | 52/97 |
| 4,707,959 A | * | 11/1987 | Stoakes | 52/235 |
| 5,333,425 A | * | 8/1994 | Nickerson et al. | 52/222 |
| 5,609,435 A | | 3/1997 | Nomura | |
| 5,644,878 A | * | 7/1997 | Wehrmann | 52/287.1 |
| 5,785,461 A | * | 7/1998 | Lambert | 403/167 |
| 5,813,641 A | * | 9/1998 | Baldwin | 248/223.41 |
| 6,006,489 A | * | 12/1999 | Zadok | 52/773 |
| 6,173,550 B1 | * | 1/2001 | Tingley | 52/837 |
| 7,389,617 B2 | * | 6/2008 | Grunewald | 52/235 |
| 2005/0235585 A1 | * | 10/2005 | Green et al. | 52/204.5 |

FOREIGN PATENT DOCUMENTS

| | | |
|---|---|---|
| DE | 19 20 525 B2 | 11/1969 |
| DE | 81 28 884.0 | 10/1981 |
| DE | 35 18 011 A1 | 11/1986 |
| DE | 196 43 529 C2 | 7/1998 |
| DE | 197 35 830 A1 | 1/1999 |
| DE | 200 15 195 U1 | 1/2001 |
| DE | 201 20 825 U1 | 6/2002 |

(Continued)

OTHER PUBLICATIONS

German Search Report dated Jul. 25, 2007 with English translation of the relevant portion (Nine (9) pages).
European Search Report dated Feb. 4, 2010 with partial English translation (eleven (11) pages).

*Primary Examiner* — Joshua J Michener
*Assistant Examiner* — Theodore Adamos
(74) *Attorney, Agent, or Firm* — Crowell & Moring LLP (57) ABSTRACT

A system for erecting structures, includes at least one support profile and at least one clamping profile. The clamping profile is attachable to a lateral face of the support profile and has at least one laterally open first groove, which, in the state of the clamping profile attached to the lateral face, extends parallel to the lateral face of the support profile in relation to its longitudinal direction.

20 Claims, 4 Drawing Sheets

(56) References Cited

FOREIGN PATENT DOCUMENTS

| | | |
|---|---|---|
| DE | 103 03 814 A1 | 8/2004 |
| DE | 20 2005 005 596 U1 | 8/2005 |
| DE | 10 2004 050 869 A1 | 5/2006 |
| EP | 0 713 556 A1 | 5/1996 |
| EP | 0 713 556 B1 | 5/1996 |
| GB | 1 277 292 | 6/1972 |

* cited by examiner

SYSTEM FOR ERECTING STRUCTURES AND SUPPORT PROFILE

BACKGROUND AND SUMMARY OF THE INVENTION

This application claims the priority of German Application No. 20 2006 018 839.8, filed Dec. 4, 2006, the disclosure of which is expressly incorporated by reference herein.

The present invention relates to a system for erecting structures and a support profile for erecting structures.

Known systems for erecting structures, in particular for tradeshow stands, have support profiles which may be connected to one another using so-called turnbuckles. The turnbuckles are inserted into chambers on the front face of a particular support profile and the support profiles have grooves, running in the longitudinal direction in the middle of their side faces, which have undercuts. A first support profile may then be placed flush on the lateral face of a further support profile and, by actuating the turnbuckle, it engages using catch hooks behind the undercuts of the groove running in the longitudinal direction and thus secures the two support profiles against one another. The turnbuckles are preferably eccentric-actuated, so that tradeshow stands may be assembled very rapidly from such support profiles, for example.

Using such systems, frame structures of the structures to be erected are first constructed. The frames may then be filled up with panels. If plate-shaped panels are inserted into the longitudinal grooves in the lateral faces of the support profile, it may be necessary to loosen the frame structure to insert the panels or to insert the panels already during the erection of the frame structure. Such frames are covered with material, and the attachment of such material coverings is thus time-consuming, because they must be laid around the support profile, tacked onto wood strips, or glued or threaded onto profile rods using loops, for example.

A system and a support profile for erecting structures are to be provided by the present invention, which make the attachment of panels or material coverings significantly easier.

For this purpose, a system is provided according to the present invention for erecting structures having a support profile and a clamping profile, the clamping profile being attachable to a lateral face of the support profile and having at least one first laterally open groove, which, in the state of the clamping profile attached to the lateral face, extends parallel to the lateral face of the support profile in relation to its longitudinal direction.

Using the clamping profile, the support profile may be supplemented in a simple way using laterally open grooves in the area of the particular lateral face of the support profile. These grooves may then be used for inserting panels or material coverings. Because the clamping profile is attachable to the lateral face of the support profile, it may first be attached to the support profile after a basic frame structure of the structure is erected. Already existing structures may thus be supplemented easily by panels or material coverings.

In a refinement of the present invention, the first groove, in the state of the clamping profile attached to the lateral face, extends parallel to the lateral face of the support profile in relation to the depth direction of the clamping profile.

A panel or a material covering may thus be inserted parallel to the lateral face of the support profile and it is thus possible that the panel extends up to directly in front of the lateral face of the support profile. In addition, it is thus possible that a material covering may be situated approximately flush to the external faces of the support profile, for example.

In a refinement of the present invention, the support profile has at least one second groove running in the longitudinal direction in its lateral face, the clamping profile being fastenable to the support profile using at least one fastener engaging in the second groove.

In this way, it is possible to fasten the clamping profile to the support profile without problems and the clamping profiles may be attached to the support profile and removed again reliably and rapidly.

In a refinement of the present invention, the second groove has at least one undercut and the fastener engages behind the undercut in the mounted state. An extremely reliable fastening may be provided in this way.

In a refinement of the present invention, the fastener is insertable into the second groove at a first angle thereto and engages behind the undercut at a second angle to the second groove, which is different from the first angle. The fastener is advantageously implemented as hooked in its section insertable into the second groove.

A fastener implemented in this way may be hung very easily in the second groove in the support profile. By simple insertion, the fastener may thus be secured in the second groove and, to fasten the clamping profile to the support profile, the fastener only still has to be adjusted in such a way that it exerts a force on the clamping profile in the direction toward the support profile. Instead of a hooked design, a T-shaped end may also be provided on the fastener, which is rotated to engage behind the undercut.

In a refinement of the present invention, the fastener is provided with a thread and a nut in its section lying outside the second groove in the mounted state.

Using the nut, the clamping profile may thus be drawn toward the support profile. This is particularly advantageous when attaching material coverings, because the material covering may be hung in the clamping profile in the still relaxed or only slightly tensioned state and then first tensioned by the gradual movement of the clamping profile toward the support profile. This gradual movement of the clamping profile may be performed by simply tightening the nut on the thread.

In a refinement of the present invention, the clamping profile is provided with an opening for inserting the fastener through, the opening being dimensioned in such a way that the fastener assumes the first angle when the clamping profile presses against the lateral face of the support profile and may be inserted into the second groove.

In this way, it is possible to first bring the clamping profile into its final position on the lateral face of the support profile, fix it there, and only then insert the fastener into the groove in the support profile. In this way, the clamping profile may be fastened very rapidly to the support profile.

In a refinement of the present invention, a textile planar element is provided, the textile planar element being at least sectionally provided with a weather strip on at least one lateral edge, which is insertable into the first groove of the clamping profile.

Material coverings having textile planar elements may thus be fastened to the clamping profile very rapidly and reliably, because the weather strip solely has to be inserted into the first groove. This makes it significantly easier to attach material coverings rapidly, as is required when erecting tradeshow stands, for example. Because the textile planar element solely has its weather strip inserted into the first groove of the clamping profile, the textile planar element is also removable again rapidly and easily, and without having to worry about damage.

In a refinement of the present invention, the weather strip has two parallel lateral faces, whose distance to one another is tailored to the width of the first groove.

In this way, the weather strip may be inserted easily into the first groove of the clamping profile. Because the textile planar element is then oriented perpendicular to the first groove and the weather strip on its lateral edges in the mounted state, the weather strip reliably holds the textile planar element on the clamping profile and/or the support profile. A pull in the surface plane of the textile planar element solely has the result that the weather strip braces in the groove. However, it is thus almost impossible that the material covering will detach unintentionally from the clamping profile. For this purpose, the weather strip and the first groove may also be tailored to one another in such a way that the weather strip is held in the first groove by a friction force sufficient for the secure hold. There are different possibilities for fastening the weather strip to the material covering. On one hand, the material may simply be laid around the weather strip, so that the weather strip lies in a material loop at the edge of the textile planar element. However, it is also possible to provide the weather strip with a sew-on tab, onto which the textile planar element is sewn.

In a refinement of the present invention, the textile planar element is implemented as stretchable.

In this way, wrinkle-free material coverings may be achieved easily. By the possibility of first inserting the weather strip of the textile planar element into the clamping profile and only then fastening the clamping profile to the support profile, the system according to the present invention makes it significantly easier to attach such stretchable textile planar elements.

In a refinement of the present invention, at least four support profiles, forming a frame, having attached clamping profiles are provided, the textile planar element being provided with a weather strip on all four lateral edges, and the textile planar element being implemented as stretchable and having a smaller area than the area enclosed by the frame in the relaxed state.

The problem on which the present invention is based is also solved by a support profile for erecting structures, in which at least one laterally open first groove is provided directly behind a lateral face of the support profile, this first groove extending parallel to the lateral face of the support profile in relation to both its longitudinal direction and also its depth direction.

Such support profiles are particularly suitable for inserting panels or material coverings, because the laterally open first groups are provided directly behind a lateral face of the support profile, the panels or material coverings being able to be situated approximately flush with the lateral face of the support profile.

In a refinement of the present invention, the first groove is at least sectionally provided with side walls running parallel to one another.

Such side walls running parallel to one another make it easier to insert weather strips of material coverings or to insert plate-shaped panels.

Further features and advantages of the present invention result from the following description in connection with the drawings.

BRIEF DESCRIPTION OF THE DRAWINGS

Individual features of the various embodiments illustrated and described may be combined arbitrarily with one another without leaving the scope of the present invention. In the drawings.

DETAILED DESCRIPTION OF THE DRAWINGS

Figure 1:
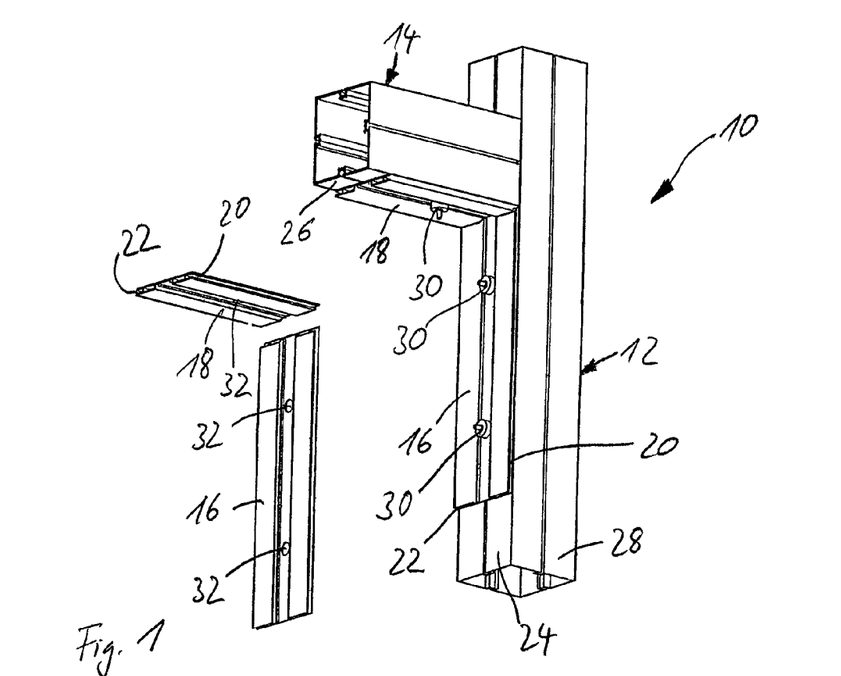
FIG. 1 shows a perspective detail illustration of a system according to the present invention for erecting structures having support profiles and clamping profiles, the clamping profiles being shown both in the attached state and also in the removed state.

The partial perspective illustration of FIG. 1 shows a system 10 for erecting structures having two support profiles 12, 14 and clamping profiles 16, 18 attached to the support profiles 12, 14. The clamping profiles 16, 18 are shown once in the attached state on the support profiles 12, 14 and once in the state removed therefrom. The clamping profiles 16, 18 each have a laterally open first groove 20, 22 on their longitudinal sides. These first grooves 20, 22 have inner side walls parallel to one another and extend parallel to a longitudinal direction of the clamping profiles 16, 18 both in their longitudinal direction and also in their depth direction. The inner side walls are implemented as smooth and the first grooves 20, 22 do not have any undercuts.

The clamping profile 16 is attached to a lateral face 24 of the support profile 12 and the clamping profile 18 is attached to a lateral face 26 of the support profile 14. The lateral first grooves 20, 22 of the clamping profile 16 extend parallel to the lateral face 24 of the support profile 12 in relation to their longitudinal direction and also extend parallel to the lateral face 24 of the support profile 12 in relation to their depth direction. A panel or a weather strip of a material covering may thus be inserted into the grooves 20, 22 parallel to the lateral face 24 and/or parallel to the lateral face 26. A plate-like panel may thus come to rest directly adjoining the lateral face 24 and/or 26 and a material covering which runs perpendicular to the lateral face 24 and/or 26 on the side of the groove 20 is then essentially flush to a further lateral face 28 of the support profile 12.

The clamping profile 16 and the clamping profile 18 are each fastened using fasteners 30 to the support profile 12 or the support profile 14. The structure of these fasteners 30 is explained in greater detail in the following. The clamping profiles 16, 18 are each provided with openings 32 in order to be able to insert the fasteners 30 through.

It may already be seen on the basis of FIG. 1 that the clamping profiles 16, 18 may be attached in an especially simple way to the support profiles 12, 14. The clamping profiles 16, 18 solely have to be laid on the lateral faces 24 or 26 of the support profiles 12 or 14 and the fasteners 30 may then be inserted through the openings 32 and tightened. The clamping profiles 16, 18 thus allow the support profiles 12, 14 to be provided with panels and special material coverings in an especially simple way.

Figure 2:
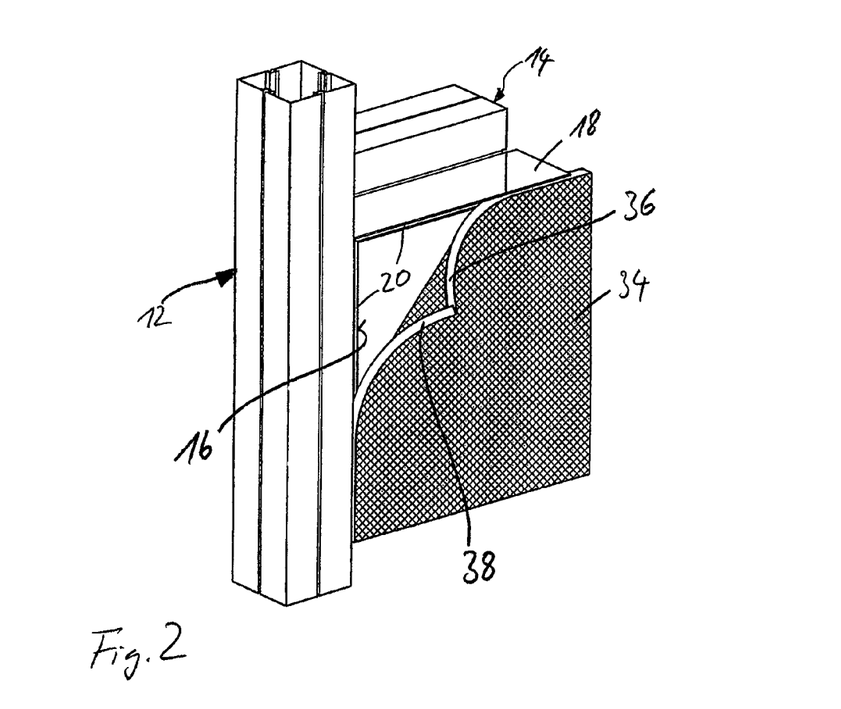
FIG. 2 shows a perspective detail illustration of the system from FIG. 1 having partially attached material covering.

The illustration of FIG. 2 shows a textile planar element 34, which is provided with weather strips 36, 38 on the lateral edges. These weather strips 36, 38 are each constructed as rectangular in cross-section and their longer sides, viewed in cross-section, thus lie in lateral faces parallel to one another. The weather strips 36, 38 are inserted into the grooves 20, 22 of the clamping profiles 16, 18 in such a way that the larger lateral faces press against the inner side walls of the grooves 20. The textile planar element 34 extends perpendicular to the weather strips 36, 38 in the attached state itself, and thus also perpendicular to the clamping profiles 16, 18. It may be seen that the textile planar element 34 is thus held very securely in the clamping profiles 16, 18 and thus indirectly also on the support profiles 12, 14, because a tensile force in the plane level of the textile planar element 34 may not result in the weather strips 36, 38 being pulled out of the groove 20, because the weather strips 36, 38 are perpendicular to the surface plane of the textile planar element 34 in the attached state. It is thus also possible to place the textile planar element 34 under pre-tension, so that a uniform, wrinkle-free surface of the textile planar element 34 may be ensured. The present invention thus allows material coverings to be attached to structures made of support profiles 12, 14 in a simple way.

Figure 3:
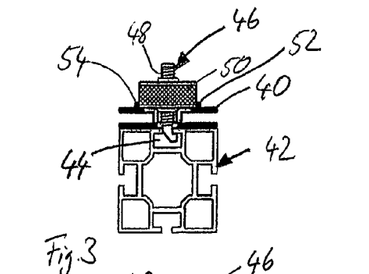
FIG. 3 shows a partial sectional view of the system according to the present invention having a support profile and a clamping profile attached to the support profile.

The illustration of FIG. 3 shows the fastening of a clamping strip 40 to a support profile 42 in detail. The support profile 42 is provided with a groove 44 in the middle of each of its lateral faces, which forms an undercut on both sides of the groove opening. A fastener 46 is inserted into the groove 44 of the support profile 42, which is implemented as hooked on its end extending into the groove 44. This hooked end may thus engage behind the undercut of the groove 44 and transmit tensile forces to the support profile 42. The fastener 46 is provided with an external thread 48 in its section lying outside the groove 44. A knurled nut 50 is screwed onto this external thread 48, which may be locked or tightened manually and thus without tools. The knurled nut 50 presses the clamping profile 40 against the lateral face of the support profile 42 and thus reliably holds the clamping profile 40 on the support profile 42.

The clamping profile 40 is provided with two strip-like projections 52, 54 on its side facing away from the support profile 42. These two strip-like projections 52, 54 leave a distance, which essentially corresponds to the diameter of the knurled nut 50, between them. After the knurled nut 50 has been tightened, its lateral faces thus press against the inner sides of the strip-like projections 52, 54. Even if a lateral force, such as a hammer blow, is then exerted on the knurled nut 50 or the external thread 48 of the fastener 46, the fastener 46 does not thus loosen from the support profile 42, because the knurled nut 50 is held in its position shown in FIG. 3 by the two strip-like projections 52, 54. The projections 52, 54 simultaneously cause the exact positioning of the clamping profile 40 on the support profile 42 in connection with the fastener 46.

Figures 4, 5:
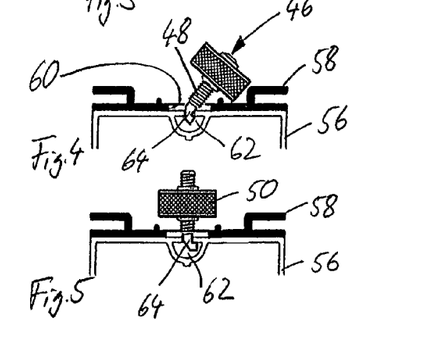
FIGS. 4 and 5 show a system according to the present invention having a support profile and a clamping profile, FIG. 4 and FIG. 5 showing different stages during the attachment of a fastener.

FIGS. 4 and 5 show the attachment of the fastener 46 to a support profile 56. A clamping profile 58 is laid on a lateral face of the support profile 56 in the illustration of FIG. 4 and the clamping profile 58 has an opening 60 which is situated above a groove 62 in the lateral face of the support profile 56. The opening 60 is dimensioned larger than the external diameter of the external thread 48 of the fastener 46, so that the fastener 46, as shown in FIG. 4, may be put on diagonally to the clamping profile 58. In the position shown in FIG. 4, the hooked section 64 of the fastener 46 may be inserted into the groove 62. After the hooked section 64 is inserted into the groove 62, the fastener 46 is brought into the angle shown in FIG. 5 and is then perpendicular to the lateral face of the support profile 56. As shown, the hooked section 64 thus engages behind the undercut of the groove 62 on one side. Subsequently, the knurled nut 50 only still has to be tightened to secure the clamping profile 58 on the support profile 56.

Figure 6:
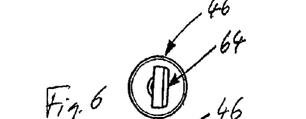
FIG. 6 shows a view of the fastener of FIG. 4 from below.
Figure 7:
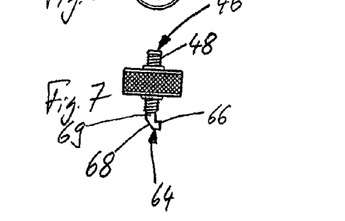
FIG. 7 shows a view of the fastener from FIG. 4 from the side.

The illustrations of FIGS. 6 and 7 show the fastener 46 in a view from below and a side view, respectively. It may be seen well in the side view of FIG. 7 that the hooked section 64 is provided with a projection 66 on one side, which extends beyond the external diameter of the external thread 48. The projection 66 thus forms a right-angled inner corner with a shaft of the fastener 46. A bevel 68 is provided diametrically opposite the projection 66. A short shaft section 69, whose external diameter is only slightly smaller than the clearance of the groove 62 at the height of the lateral face of the support profile 56 which faces toward the clamping profile 58, is situated between the bevel 68 and the external thread 48 and/or the projection 66 and the external thread 48. The bevel 68 is situated in such a way that a transverse dimension of the hooked section 64 perpendicular to the bevel 68 is less than the width of the opening of the groove 62. It is thus possible, as was explained on the basis of FIGS. 4 and 5, to insert the hooked section 64 of the fastener 46 into the groove 62 at the first angle shown in FIG. 4. After the tilting into the second angle, which is shown in FIG. 5, the fastener 46 may no longer be pulled out of the groove 62 perpendicularly to the lateral face of the support profile 56, because the projection 66 hooks behind the undercut of the groove 62 and a lateral displacement of the projection 66 is blocked in that the shaft of the fastener 30 has approximately the width of the opening of the groove 62.

The view of the fastener 46 from below of FIG. 6 shows that the hooked section 64 is greatly widened in relation to the shaft and the external thread 48. The projection 66 may thus engage on the undercut of the groove 62 over a length which approximately corresponds to three times the external diameter of the external thread 48 and thus ensures a uniform force introduction into the support profile 56.

Figure 8:
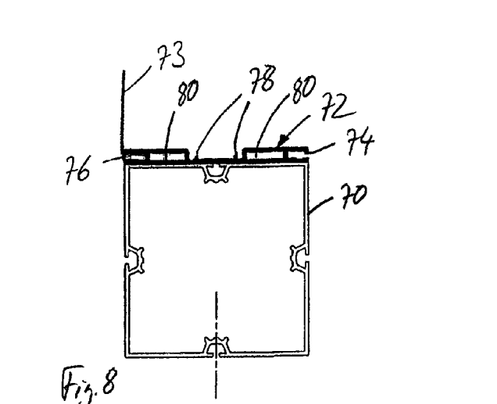
FIG. 8 shows a further system according to the present invention having a support profile and a clamping profile.

The illustration of FIG. 8 shows a support profile 70 having a clamping profile 72 resting on a lateral face of the support profile 70. The clamping profile 72 is precisely as wide as the support profile 70, so that a schematically indicated material cover 73, which is situated on the clamping profile 72, may run essentially flush to the external sides of the support profile 70. Furthermore, it may be seen that the clamping profile 72 is provided with two hollow cavities 80, which each adjoin the grooves 74 and 76, respectively, in addition to the laterally opening grooves 74, 76 and strip-like projections 78 for retaining the knurled nut 50. The clamping profile 72 may be significantly stiffened by the solid chambers 80. The clamping profile 72 may thus be implemented as comparatively wide in relation to its height and nonetheless stable, for example, from extrusion-molded aluminum profile.

Figure 9:
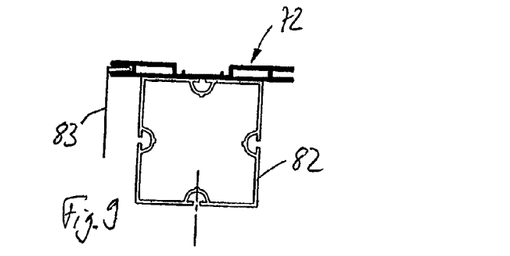
FIG. 9 shows a further system according to the present invention having a support profile and a clamping profile.

The illustration of FIG. 9 shows the clamping profile 72 placed on a support profile 82. The support profile 82 is narrower than the clamping profile 72, so that a schematically indicated material covering 83, which is attached to the clamping profile 72, may be led past at a distance in front of the support profile 82. In this way, for example, a supporting frame structure made of support profiles 82 may be completely concealed.

Figure 10:
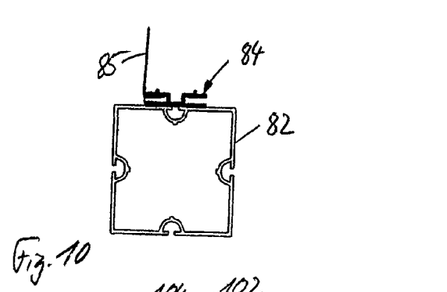
FIG. 10 shows a further system according to the present invention having a support profile and a clamping profile.

The illustration of FIG. 10 shows the support profile 82 having a clamping profile 84 placed thereon. The clamping profile 84 is implemented as significantly narrower than the clamping profile 72 and also narrower than the support profile 82. A schematically indicated material cover 85, which is attached using the support profile 84, thus allows a frame structure made of support profiles 82 to be easily recognized and only fills up the intermediate spaces of such a frame structure, the material covering 85 additionally being set back in relation to an exterior side of the support profile 82.

Figure 11:
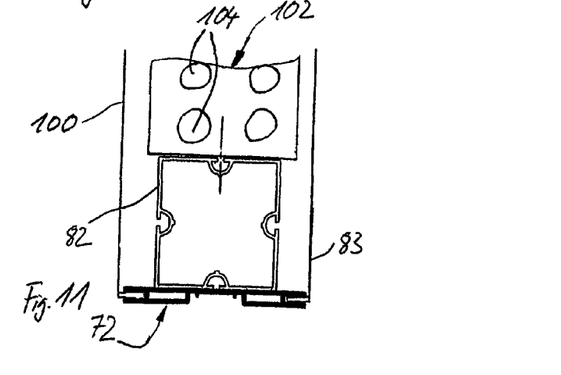
FIG. 11 shows a system from FIG. 9 in one embodiment.

The illustration of FIG. 11 shows the support profile 82, the clamping profile 72, and the material cover 83 from FIG. 9 in a further embodiment of the present invention. In addition to the material cover 83, a further material cover 100 is situated on the diametrically opposite side of the symmetrically implemented clamping profile 72. A wall covered with material on two sides thus results, which may be used as a partition wall, for example. Because the clamping profile 72 projects beyond the lateral delimitations of the support profile 82, this partition wall thus resulting is comparatively thick. Space for situating backlighting 102 of the material coverings 83, 100 is thus provided between the two material coverings 83, 100. The backlighting 102 is schematically indicated in the illustration of FIG. 11, the backlighting 102 having multiple lights 104.

Back lights implemented more narrowly may also be situated between two material covers in the embodiments of the present invention shown in FIG. 8 and FIG. 10, for example.

Figure 12:
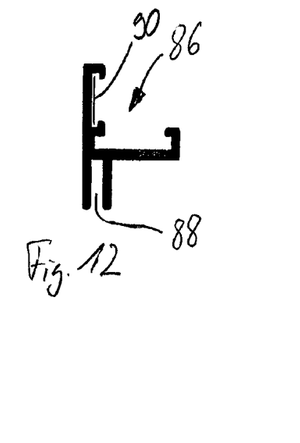
FIG. 12 shows a sectional view of a support profile according to the present invention.

The illustration of FIG. 12 shows a support profile 86 according to the present invention which is provided with a laterally open first groove 88. As described, panels or weather strips of material covers may be inserted into this groove 88. A corner reinforcement 90 allows two support profiles 86 to be connected to form a corner frame. A frame construction, for example, comprising four support profiles 86, may be used as a ceiling panel, for example, and suspended from the ceiling using cable suspensions which are fastened in the two grooves diametrically opposite the groove 88.

Figure 13:
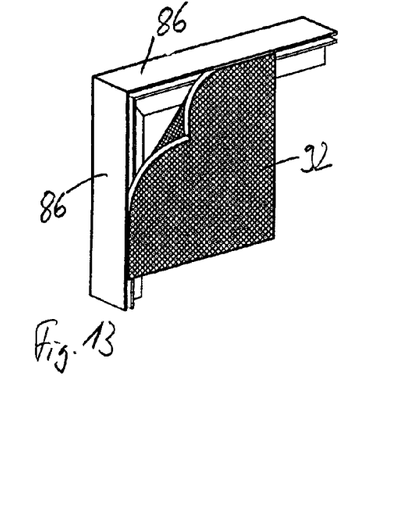
FIG. 13 shows a frame corner erected using the support profile of FIG. 11, to which a material covering is partially fastened.

The illustration of FIG. 13 shows a frame corner which is constructed from two support profiles 86. A textile planar element 92 is provided with weather strips on its lateral edges, which are inserted into the grooves 88 of the support profile 86.

Figure 14:
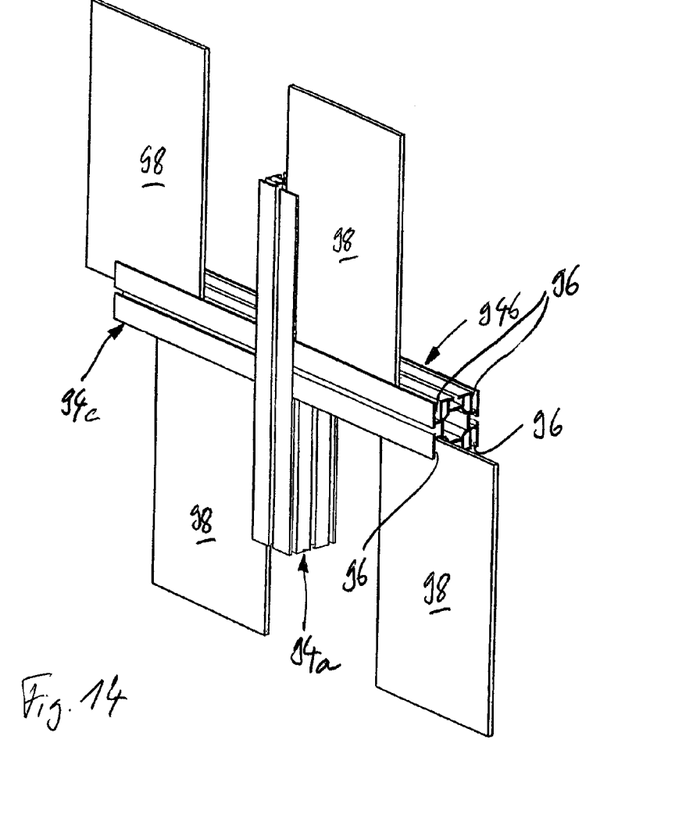
FIG. 14 shows a frame cross erected using a support profile according to the present invention.

The illustration of FIG. 14 shows three further support profiles 94a, 94b, 94c according to the present invention, which are assembled into a frame cross. The support profiles 94a, 94b, 94c each have four laterally open grooves side walls 96 parallel to one another, in which plates 98 may be inserted, for example.

Figure 15:
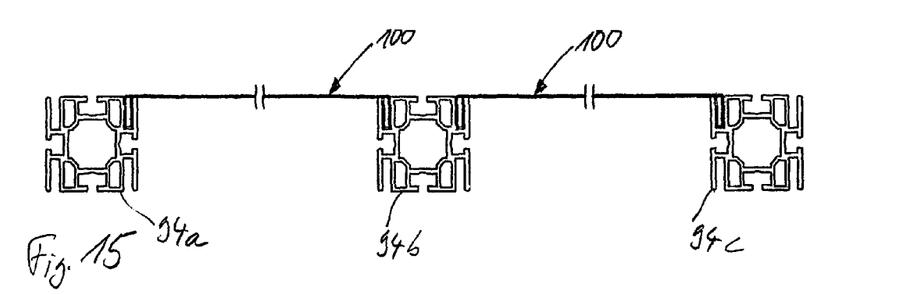
FIG. 15 shows a top view of a wall structure having a support profile of FIG. 14.
Figure 16:
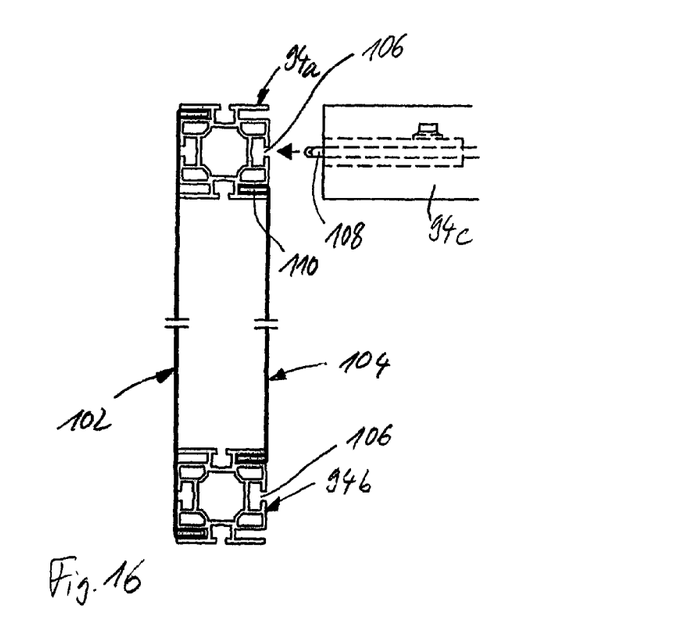
FIG. 16 shows a further wall structure having the support profile of FIG. 14.

The illustrations of FIGS. 15 and 16 show top views of wall structures having support profiles 94a, 94b, 94c. In the illustration of FIG. 15, a material covering 100 is situated between each two support profiles 94a, 94b, 94c. As may be seen, the material coverings 100 run approximately flush to an external side of the support profiles 94a, 94b, 94c which is at the top in the illustration of FIG. 15. In the structure selected in FIG. 14, the external sides of the support profiles 94a, 94b, 94c are sectionally visible.

The illustration of FIG. 16 shows a further wall construction having three support profiles 94a, 94b, 94c. A first material covering 102 is attached to an exterior side of the support profiles 94a, 94b, on the left in the illustration of FIG. 15, in such a way that the support profiles 94a, 94c are nearly completely covered on this side. A further material covering 104 on the side of the support profiles 94a, 94b on the right in the illustration of FIG. 15, in contrast, is situated in such a way that the support profiles 94a, 94b are still visible and a middle second groove 106 of the support profile 94, which is provided with undercuts, is exposed. A turnbuckle 108, which is only schematically illustrated in the illustration of FIG. 15, may engage in this groove 106, by which a further support profile 94c may be attached perpendicularly to the exterior sides, on the right in the illustration of FIG. 15, of the support profiles 94a, 94b provided with material coverings 102, 104.

It may be seen that in the attached state, the support profile 94c covers the weather strip 110 of the material covering 104. In this way, very visually appealing designs may be achieved using material coverings.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for erecting textile structures, the system comprising:
   at least one support profile; and
   at least one monolithic clamping profile, the clamping profile being attachable to a lateral face of the support profile and having two laterally open first grooves, each of which is defined by a first wall, a second wall, and a third wall, wherein:
   each of the first grooves is configured to receive a textile planar element having a plane oriented substantially perpendicular to the lateral face of the support profile,
   the two first grooves are open to opposite sides of the clamping profile, and
   in the state of the clamping profile being attached to the lateral face of the support profile:
   each of the first grooves extends parallel, in relation to a longitudinal direction of the respective first groove, to the lateral face of the support profile, and
   for each of the first grooves:
      a plane of the first wall and a plane of the third wall are parallel to a plane of the lateral face of the support profile,
      a plane of the second wall is perpendicular to the plane of the lateral face of the support profile,
      the plane of the third wall directly abuts the plane of the lateral face of the support profile,
      the second wall is arranged between the first wall and the third wall,
      the first wall extends from the plane of the second wall and terminates at a side plane that is parallel to the plane of the second wall and spaced at a distance from the second wall,
      the third wall extends from the plane of the second wall and terminates at the side plane, and an entire width of the first groove is open at the side plane, wherein the width of the first groove extends from the plane of the first wall to the plane of the third wall.

2. The system according to claim 1, wherein, in the state of the clamping profile being attached to the lateral face of the support profile, each of the first grooves extends parallel, in relation to a depth direction of the respective first groove, to the lateral face of the support profile.

3. The system according to claim 2, wherein the support profile has at least one second groove whose longitudinal direction runs parallel to the lateral face of the support profile, the clamping profile being fastenable to the support profile using at least one fastener which engages in the second groove.

4. The system according to claim 2, wherein a second groove of the support profile has at least one undercut and a fastener engages behind the undercut in the mounted state.

5. The system according to claim 1, wherein the support profile has at least one second groove whose longitudinal direction runs parallel to the lateral face of the support profile, the clamping profile being fastenable to the support profile using at least one fastener which engages in the second groove.

6. The system according to claim 5, wherein the second groove has at least one undercut and the fastener engages behind the undercut in the mounted state.

7. The system according to claim 6, wherein the fastener is insertable into the second groove at a first angle thereto and engages behind the undercut at a second angle to the second groove, which is different from the first angle.

8. The system according to claim 7, wherein the fastener is implemented as hooked in a section of the fastener that is insertable into the second groove.

9. The system according to claim 6, wherein the fastener is implemented as hooked in a section of the fastener that is insertable, into the second groove.

10. The system according to claim 5, wherein a section of the fastener lying outside the second groove in a mounted state is provided with a thread and a nut.

11. The system according to claim 10, wherein the clamping profile is provided with an opening for inserting the fastener through, the opening being dimensioned such that the fastener may assume a first angle when the clamping profile presses against the lateral face of the support profile and may be inserted into the second groove.

12. The system according to claim 5, wherein the clamping profile is provided with an opening for inserting the fastener through, the opening being dimensioned such that the fastener may assume a first angle when the clamping profile presses against the lateral face of the support profile and may be inserted into the second groove.

13. The system according to claim 1, wherein the textile planar element is provided at least sectionally on at least one lateral edge with a weather strip, which is insertable into the first grooves of the clamping profile.

14. The system according to claim 13, wherein the weather strip has two parallel lateral faces, whose distance to one another is tailored to the width of the first grooves.

15. The system according to claim 14, wherein the textile planar element is stretchable.

16. The system according to claim 13, wherein the textile planar element is stretchable.

17. The system according to claim 13, further comprising at least four support profiles, which form a frame, having attached clamping profiles, wherein:
the textile planar element comprises four lateral edges and a weather strip on each of the four lateral edges,
the textile planer element is stretchable, and
the textile planar element has a smaller area than an area enclosed by the frame in a relaxed state.

18. The system according to claim 1, wherein a second groove of the support profile has at least one undercut and a fastener engages behind the undercut in the mounted state.

19. The system according to claim 1, wherein each of the first wall, the second wall, and the third wall is substantially flat.

20. A support profile for erecting textile structures, the support profile being monolithic and comprising two laterally open first grooves, each of which is defined by a first wall, a second wall, and a third wall, wherein:
each of the first grooves is configured to receive a textile planar element having a plane oriented substantially perpendicular to a lateral face of the support profile,
the two first grooves are open to opposite sides of the support profile,
each of the first grooves extends parallel to the lateral face of the support profile in relation to both a longitudinal direction and a depth direction of the respective first groove, and
for each of the first grooves:
a plane of the first wall and a plane of the third wall are parallel to a plane of the lateral face of the support profile,
a plane of the second wall is perpendicular to the plane of the lateral face of the support profile,
the first wall extends from the plane of the second wall and terminates at a side plane that is parallel to the plane of the second wall and spaced at a distance from the second wall,
the third wall extends from the plane of the second wall and terminates at the side plane, and
an entire width of the first groove is open at the side plane, wherein the width of the first groove extends from the plane of the first wall to the plane of the third wall.

* * * * *